United States Patent

Calabro et al.

Patent Number: 5,110,572
Date of Patent: * May 5, 1992

[54] SYNTHESIS OF MESOPOROUS CRYSTALLINE MATERIAL USING ORGANOMETALLIC REACTANTS

[75] Inventors: David C. Calabro, Somerset; Kirk D. Schmitt, Pennington, both of N.J.; James C. Vartuli, West Chester, Pa.

[73] Assignee: Mobil Oil Corp., Fairfax, Va.

[*] Notice: The portion of the term of this patent subsequent to Apr. 7, 2009 has been disclaimed.

[21] Appl. No.: 720,105

[22] Filed: Jun. 24, 1991

Related U.S. Application Data

[63] Continuation-in-part of Ser. No. 625,238, Dec. 10, 1990, which is a continuation-in-part of Ser. No. 470,008, Jan. 25, 1990.

[51] Int. Cl.$^5$ .............................. C01B 33/34
[52] U.S. Cl. ........................... 423/328; 502/60
[58] Field of Search ............... 423/277, 326, 328, 329, 423/330, 331, 332; 502/60, 64, 77, 79, 241, 242

[56] References Cited

PUBLICATIONS

Pouxviel, J. C. et al., "Fluorescence Study of Aluminosilicate Sols and Gels Doped with Hydroxy Trisulfenated Pyrene", J. Phys. Chem. 93, 2134-2139 (1989).

Pouxviel, J. C. et al., "Gels from a Double Alkoxide $(BuO)_2-Al-O-Si-(OET)_3$", J. Materials Science 24, 321-327 (1989).

Pouxviel, J. C. et al., "Growth Process and Structure of Aluminosilicate Gels", J. Physique, Paris, 48, 921-925 (1987).

Primary Examiner—R. Bruce Breneman
Attorney, Agent, or Firm—Alexander J. McKillop; Charles J. Speciale; Dennis P. Santini

[57] ABSTRACT

This invention relates to a method for synthesizing ultra-large pore crystalline material which can be used as a sorbent or catalyst component for conversion of organic and inorganic compounds. A dialkoxyaluminoxytrialkoxysilane is added to the reaction mixture as a metal oxide source.

27 Claims, 2 Drawing Sheets

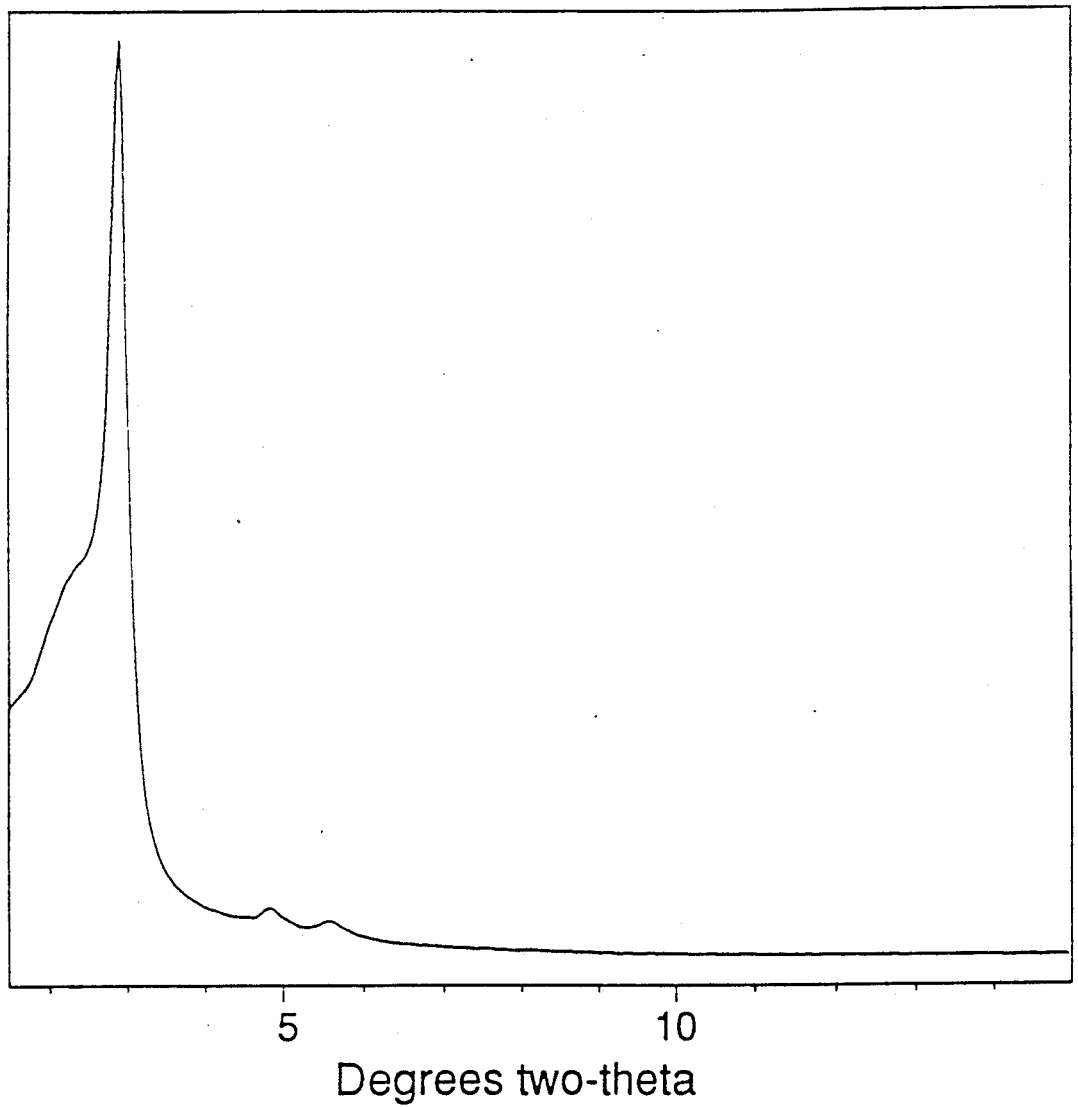
Degrees two-theta
FIG. 2
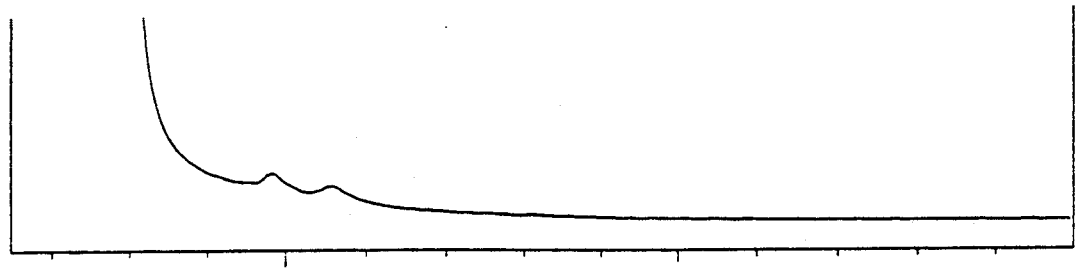

SYNTHESIS OF MESOPOROUS CRYSTALLINE MATERIAL USING ORGANOMETALLIC REACTANTS

CROSS-REFERENCE TO RELATED APPLICATIONS

This application is a continuation-in-part of U.S. patent application Ser. No. 625,238 filed Dec. 10, 1990, which was a continuation-in-part of application Ser. No. 470,008 filed Jan. 25, 1990.

BACKGROUND OF THE INVENTION

1. Field of the Invention

This invention relates to the use of dialkoxyaluminoxytrialkoxysilanes in the synthesis of ultra-large pore crystalline material which can be used as a sorbent or a catalyst component.

2. Description of the Prior Art

Porous inorganic solids have found great utility as catalysts and separations media for industrial application. The openness of their microstructure allows molecules access to the relatively large surface areas of these materials that enhance their catalytic and sorptive activity. The porous materials in use today can be sorted into three broad categories using the details of their microstructure as a basis for classification. These categories are the amorphous and paracrystalline supports, the crystalline molecular sieves and modified layered materials. The detailed differences in the microstructures of these materials manifest themselves as important differences in the catalytic and sorptive behavior of the materials, as well as in differences in various observable properties used to characterize them, such as their surface area, the sizes of pores and the variability in those sizes, the presence or absence of X-ray diffraction patterns and the details in such patterns, and the appearance of the materials when their microstructure is studied by transmission electron microscopy and electron diffraction methods.

Amorphous and paracrystalline materials represent an important class of porous inorganic solids that have been used for many years in industrial applications. Typical examples of these materials are the amorphous silicas commonly used in catalyst formulations and the paracrystalline transitional aluminas used as solid acid catalysts and petroleum reforming catalyst supports. The term "amorphous" is used here to indicate a material with no long range order and can be somewhat misleading, since almost all materials are ordered to some degree, at least on the local scale. An alternate term that has been used to described these materials is "X-ray indifferent". The microstructure of the silicas consists of 100-250 Angstrom particles of dense amorphous silica (*Kirk-Othmer Encyclopedia of Chemical Technology*, 3rd Edition, Vol. 20, John Wiley & Sons, New York, p. 766-781, 1982), with the porosity resulting from voids between the particles. Since there is no long range order in these materials, the pore sizes tend to be distributed over a rather large range. This lack of order also manifests itself in the X-ray diffraction pattern, which is usually featureless.

Paracrystalline materials such as the transitional aluminas also have a wide distribution of pore sizes, but better defined X-ray diffraction patterns usually consisting of a few broad peaks. The microstructure of these materials consists of tiny crystalline regions of condensed alumina phases and the porosity of the materials results from irregular voids between these regions (K. Wefers and Chanakya Misra, "Oxides and Hydroxides of Aluminum", Technical Paper No. 19 Revised, Alcoa Research Laboratories, p. 54-59, 1987). Since, in the case of either material, there is no long range order controlling the sizes of pores in the material, the variability in pore size is typically quite high. The sizes of pores in these materials fall into a regime called the mesoporous range, which, for the purposes of this application, is from about 13 to 200 Angstroms.

In sharp contrast to these structurally ill-defined solids are materials whose pore size distribution is very narrow because it is controlled by the precisely repeating crystalline nature of the materials' microstructure. These materials are called "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolite material. Since the dimensions of these pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g. $AlO_4$, in which the tetrahedra are cross-linked by the sharing of oxygen atoms whereby the ratio of the total Group IIIB element, e.g. aluminum, and Group IVB element, e.g. silicon, atoms to oxygen atoms is 1:2. The electrovalence of the tetrahedra containing the Group IIIB element, e.g. aluminum, is balanced by the inclusion in the crystal of a cation, for example, an alkali metal or an alkaline earth metal cation. This can be expressed wherein the ratio of the Group IIIB element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865 and 4,104,294 describe crystalline silicate of varying alumina and metal content.

Aluminum phosphates are taught in the U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms, is the "$H_1$" phase or hydrate of aluminum phosphate of Fd'Yvoire, *Memoir Presented to the Chemical Society*, No. 392, "Study of Aluminum Phosphate and Trivalent Iron", Jul. 6, 1961 (received), pp. 1762–1776. This material, when crystalline, is identified by the JCPDS International Center for Diffraction Data card number 15-274. Once heated at about 110° C., however, the d'Yvoire material becomes amorphous or transforms to the aluminophosphate form of tridymite.

Compositions comprising crystals having a framework topology after heating at 110° C. or higher giving an X-ray diffraction pattern consistent with a material having pore windows formed by 18 tetrahedral members of about 12-13 Angstroms in diameter are taught in U.S. Pat. No. 4,880,611.

A naturally occurring, highly hydrated basic ferric oxyphosphate mineral, cacoxenite, is reported by Moore and Shen, *Nature*, Vol. 306, No. 5941, pp. 356–358 (1983) to have a framework structure containing very large channels with a calculated free pore diameter of 14.2 Angstroms. R. Szostak et al., *Zeolites: Facts, Figures, Future*, Elsevier Science Publishers B.V., 989, present work showing cacoxenite as being very hydrophilic, i.e. adsorbing non-polar hydrocarbons only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorous, i.e. silicoaluminophosphates of particular structures are taught in U.S. Pat. Nos. 3,355,246 (i.e. ZK-21) and 3,791,964 (i.e. ZK-22). Other teachings of silico-aluminophosphates and their synthesis include U.S. Pat. Nos. 4,673,559 (two-phase synthesis method); 4,623,527 (MCM-10); 4,639,358 (MCM-1); 4,647,442 (MCM-2); 4,664,897 (MCM-4); 4,638,357 (MCM-5); and 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417; and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 2 to 20 Angstroms, with the largest reported being about 12 Angstroms.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include silicates, magadiite, kenyaite, trititanates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, at a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

Applicants know of no prior art teaching the presently claimed synthetic ultra-large pore non-layered crystalline materials and improved method for their synthesis.

SUMMARY OF THE INVENTION

The present invention is directed to an improved method for synthesis of a novel synthetic composition of matter comprising an ultra-large pore crystalline material which can be used as a sorbent or as a catalyst component for conversion of organic and inorganic compounds contacted therewith. In the synthesis method, a reaction mixture is prepared comprising one or a combination of oxides selected from a group consisting of divalent element, trivalent element, tetravalent element and pentavalent element, organic directing agent and solvent or solvent mixture. In the improved method, a dialkoxyaluminoxytrialkoxysilane (DAALS) is added to the reaction mixture. When DAALS is used in the synthesis reaction mixture, the final product can attain a $SiO_2/Al_2O_3$ ratio less than about 20. The reaction mixture is maintained under sufficient conditions of pH, temperature and time for formation of the crystalline composition and the composition is recovered.

The crystalline material is a composition of matter comprising an inorganic, porous, non-layered crystalline phase material exhibiting, after calcination, an X-ray diffraction pattern with at least one peak at a d-spacing greater than about 18 Angstrom Units having a benzene adsorption capacity of greater than 15 grams benzene per 100 grams of said material at 50 torr and 25° C.

In a preferred embodiment, the invention resides in a composition of matter comprising an inorganic, porous crystalline phase material having a hexagonal arrangement of uniformly-sized pores at least about 13 Angstroms diameter and exhibiting, after calcination, a hexagonal electron diffraction pattern that can be indexed with a $d_{100}$ value greater than 18 Angstrom Units.

BRIEF DESCRIPTION OF DRAWINGS

FIGS. 1 and 2 are X-ray diffraction patterns of products of Examples 1 and 2 hereinafter presented.

DESCRIPTION OF SPECIFIC EMBODIMENTS

Figure 1:
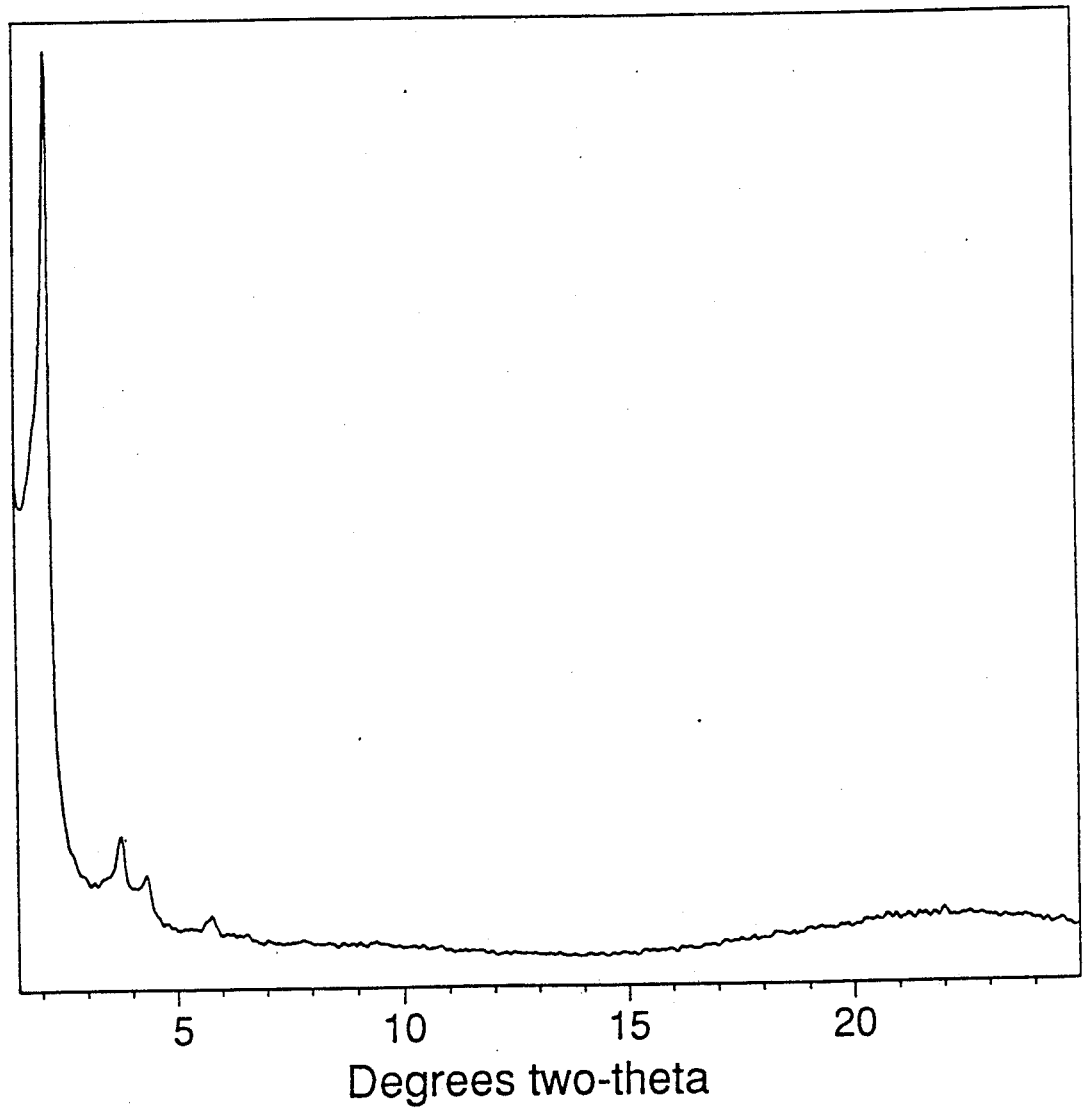

In the art of crystalline molecular sieves, when a molecular sieve crystalline lattice contains trivalent and tetravalent elements, e.g. aluminum and silicon, the ion-exchange capacity of the crystalline molecular sieve material is dependent upon its trivalent element content. Thus, for example, the more trivalent element there is in a crystalline structure containing trivalent and tetravalent oxides, the more cations are required to balance the electronegativity thereof, and when such cations are of the acidic type such as hydrogen, they impart increased catalytic activity to the crystalline material. A decreased $SiO_2/Al_2O_3$ ratio also enhanced a hydrophilic property in the crystalline material. In the crystallization, the silica/alumina mole ratio is essentially determined by the nature of the starting materials and the relative quantities of such materials used in the crystallization.

Some sources of aluminum used in the synthesis of molecular sieves have been sodium aluminate, aluminum sulfate and alumina. Silica sources have included both inorganic silicates such as sodium silicate, silica hydrosol, colloidal silica, silica gel and silicic acid, e.g. the commercial products Ludox HS-40, HiSil and UltraSil, and organic silica sources such as tetraalkyl silicates and tetraalkoxy silicates.

The synthesis method of the present invention uses an organometallic silicon- and aluminum-containing compound. The use of this compound in the synthesis of the present crystalline material allows for the formation of crystalline materials having unique chemical compositions in regard to their silica/alumina ratios, i.e. a $SiO_2/Al_2O_3$ less than about 100, preferably less than about 20, more preferably less than about 10.

An organometallic compound used herein is an unusual double alkoxide, i.e. a dialkoxyaluminoxytrialkoxysilane (DAALS) having the general formula $(RO)_2—Al—O—Si—(OR')_3$ wherein $R=C_{1-4}$ and $R'=C_{1-4}$. The preferred dialkoxyaluminoxytrialkoxysilane is di-s-butoxyaluminoxytriethoxysilane (DBALS). In the present synthesis, the DAALS may be used as the sole source of both aluminum oxide and silicon oxide. The DAALS can be used as essentially the sole source of aluminum oxide and another silicon oxide source, organic or inorganic, may also be added in the synthesis mixture. DBALS is commercially available from Petrarch Systems, Bristol, Pa. This compound has been previously used in the preparation of dense, ceramic materials such as mullite and there has been no suggestion to use dialkoxyaluminoxyalkoxysilanes in the synthesis of porous molecular sieves.

As demonstrated hereinafter, the inorganic, non-layered mesoporous crystalline material of this invention has the following composition:

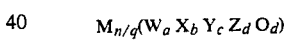
$$M_{n/q}(W_a X_b Y_c Z_d O_d)$$

wherein W is a divalent element, such as a divalent first row transition metal, e.g. manganese, cobalt and iron, and/or magnesium, preferably cobalt, X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c and d are mole fractions of W, X, Y and Z, respectively; h is a number of from 1 to 2.5; and $(a+b+c+d)=1$.

A preferred embodiment of the above crystalline material is when $(a+b+c)$ is greater than d, and $h=2$. A further embodiment is when a and $d=0$, and $h=2$.

In the as-synthesized form, the material of this invention has a composition, on an anhydrous basis, expressed empirically as follows:

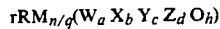
$$rRM_{n/q}(W_a X_b Y_c Z_d O_h)$$

wherein R is the total organic material not included in M as an ion, and r is the coefficient for R, i.e. the number of moles or mole fraction of R.

The M and R components are associated with the material as a result of their presence during crystallization, and are easily removed or, in the case of M, replaced by post-crystallization methods hereinafter more particularly described.

To the extent desired, the original M, e.g. sodium ions of the as-synthesized material of this invention can be replaced in accordance with techniques well known in the art, at least in part, by ion exchange with other ions. Preferred replacement ions include metal ions, hydrogen ions, hydrogen precursor, e.g. ammonium, ions and mixtures thereof. Particularly preferred ions are those which tailor the catalytic activity for certain hydrocarbon conversion reactions. These include hydrogen, rare earth metals and metals of Group IV (e.g. K), IIA (e.g. Ca), VIIA (e.g. Mn), VIIIA (e.g. Ni), IB (e.g. Cu), IIB (e.g. Zn), IIIB (e.g. In), IVB (e.g. Sn), and VIIB (e.g. F) of the Periodic Table of the Elements (Sargent-Welch Scientific Co. Cat. No. S-18806. 1979) and mixtures thereof.

The crystalline (i.e. meant here as having sufficient order to provide a diffraction pattern such as, for example, by X-ray, electron or neutron diffraction, following calcination with at least one peak) mesoporous material of this invention may be characterized by its heretofore unknown structure, including extremely large pore windows, and high sorption capacity. The term "mesoporous" is used here to indicate crystals having uniform pores within the range of at least about 13 Angstroms or from about 13 Angstroms to about 200 Angstroms. The materials of this invention will have uniform pores within the range of from about 13 Angstroms to about 200 Angstroms, more usually from about 15 Angstroms to about 100 Angstroms. For the purposes of this application, a working definition of "porous" is a material that adsorbs at least 1 gram of a small molecule, such as Ar, $N_2$, n-hexane or cyclohexane, per 100 grams of the solid.

The material of the present invention can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. In one embodiment, the material appears to have a hexagonal arrangement of large channels that can be synthesized with open internal diameters from about 13 Angstroms to about 200 Angstroms. The term "hexagonal" is intended to encompass not only materials that exhibit mathematically perfect hexagonal symmetry within the limits of experimental measurement, but also those with significant observable deviations from that ideal state. A working definition as applied to the microstructure of the present invention would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as ±25% random deviation from the average repeat distance between adjacent channels still clearly give recognizable images of the present ultra-large pore materials. Comparable variations are also observed in the $d_{100}$ values from the electron diffraction patterns.

The most regular preparations of the material of the present invention give an X-ray diffraction pattern with a few distinct maxima in the extreme low angle region. The positions of these peaks approximately fit the positions of the hkO relections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of the material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hkO projection of the hexagonal lattice and is related to the repeat distance $a_0$ between channels observed in the electron micrographs through the formula $d_{100} = a_0\sqrt{3}/2$. This $d_{100}$ spacing observed in the electron diffraction patterns corresponds to the d-spacing of a low angle peak in the X-ray diffraction pattern of the material. The most highly ordered preparations of the material obtained so far have 20–40 distinct spots observable in the electron diffraction patterns. These patterns can be indexed with the hexagonal hkO subset of unique relections of 100, 110, 210, etc., and their symmetry-related reflections.

In its calcined form, the crystalline material of the invention may be further characterized by an X-ray diffraction pattern with at least one peak at a position greater than about 18 Angstrom Units d-spacing (4.909 degrees two-theta for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. This sorption is based on the assumption that the crystal material has been treated, if necessary, to insure no pore blockage by incidental contaminants.

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the crystal of the invention.

More particularly, the calcined crystalline non-layered material of the invention may be characterized by an X-ray diffraction pattern with at least two peaks at positions greater than about 10 Angstrom Units d-spacing (8.842 degrees two-theta for Cu K-alpha radiation), at least one of which is at a position greater than about 18 Angstrom Units d-spacing, and no peaks at positions less than about 10 Angstrom units d-spacing with relative intensity greater than about 20% of the strongest peak. Still more particularly, the X-ray diffraction pattern of the calcined material of this invention will have no peaks at positions less than about 10 Angstrom units d-spacing with relative intensity greater than about 10% of the strongest peak. In any event, at least one peak in the X-ray diffraction pattern will have a d-spacing that corresponds to the $d_{100}$ value of the electron diffraction pattern of the material.

Still more particularly, the calcined inorganic, non-layered crystalline material of the invention is characterized as having a pore size of about 13 Angstroms or greater as measured by physisorption measurements, hereinafter more particularly set forth. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beams in order to resolve the low angle peak from the transmitted incident X-ray beam.

The diffraction data were recorded by step-scanning at 0.04 degrees of two-theta, where theta is the Bragg angle, and a counting time of 10 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75-100), s=strong (50-74), m=medium (25-49) and w=weak (0-24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the material of the invention, after dehydration or calcination at, for example, about 450° C.-700° C. or about 540° C. for at least about one hour and other treatment, if necessary, in an attempt to remove any pore blocking contaminants, at 25° C. and 50 torr benzene until equilibrium is reached. The weight of benzene sorbed is then determined as more particularly described hereinafter.

When used as a sorbent or catalyst component, the composition of the invention should be subjected to treatment to remove part or all of any organic constituent. The present composition can also be used as a catalyst component in intimate combination with a hydrogenating component such as tungsten, vanadium, molybdenum, rhenium, nickel, cobalt, chromium, manganese, or a noble metal such as platinum or palladium or mixtures thereof where a hydrogenation-dehydrogenation function is to be performed. Such component can be in the composition by way of co-crystallization, exchanged into the composition to the extent a Group IIIB element, e.g. aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The above crystalline material, especially in its metal, hydrogen and ammonium forms can be beneficially converted to another form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions.

The crystalline material of this invention, when employed either as an adsorbent or as a catalyst component in an organic compound conversion process should be dehydrated, at least partially. This can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

The usual method for synthesis of the ultra-large pore crystalline material involves preparation of a particular reaction mixture comprising sources of alkali or alkaline earth metal cation, if desired, one or a combination of oxides selected from the group consisting of divalent element, trivalent element, tetravalent element and pentavalent element, an organic directing agent and solvent or solvent mixture, maintaining said mixture under sufficient conditions of pH, temperature and time for formation of said composition of matter, and recovering said composition of matter. In this usual method, the organic directing agent is an ion of the formula $R_1R_2R_3R_4Q^+$, wherein Q is nitrogen or phosphorus and wherein at least one of $R_1$, $R_2$, $R_3$ and $R_4$ is aryl or alkyl of from 6 to about 36 carbon atoms or combinations thereof, the remainder of $R_1$, $R_2$, $R_3$ and $R_4$ being selected from the group consisting of hydrogen, alkyl of from 1 to 5 carbon atoms and combinations thereof. The compound from which the above organic directing agent ammonium or phosphonium ion is derived may be, for example, the hydroxide, halide, silicate or mixture thereof.

The solvent or solvent mixture for use in the usual method comprises a $C_1$-$C_6$ alcohol, $C_1$-$C_6$ diol, water or mixture thereof, with water preferred.

A first method involves a react having an $X_2O_3/YO_2$ mole ratio of from 0 to about 0.5, but an $Al_2O_3/SiO_2$ mole ratio of from 0 to 0.01, a crystallization temperature of from about 25° C. to about 250° C., preferably from about 50° C. to about 175° C., and an organic directing agent, hereinabove more particularly described, or, preferably a combination of that organic directing agent plus an additional organic directing agent, hereinafter more particularly described. This first method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, an organic (R) directing agent, hereinabove more particularly described, and a solvent or solvent mixture, such as, for example, $C_1$–$C_6$ alcohols, $C_1$–$C_6$ diols and/or water, especially water, said reaction mixture having a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2·WO + Z_2O_5 + X_2O_3)$ | 0.01 to 2.0 | 0.03 to 1.0 | wherein e and f are the weighted average valences of M and R, respectively.

In this first method, when no Z and/or W oxides are added to the reaction mixture, the pH is important and must be maintained at from about 9 to about 14. When Z and/or W oxides are present in the reaction mixture, the pH is not narrowly important for synthesis of the present crystalline material. In this, as well as the following methods for synthesis of the present material the $R_{2/f}O/(YO_2+WO+Z_2O_5+X_2O_3)$ ratio is important. When this ratio is less than 0.01 or greater than 2.0, impurity products tend to be synthesized at the expense of the present material.

A second method for synthesis of the present crystalline material involves a reaction mixture having an $X_2O_3/YO_3$ mole ratio of from about 0 to about 0.5, a crystallization temperature of from about 25° C. to about 250° C., preferably from about 50° C. to about 175° C., and two separate organic directing agents, i.e. the organic and additional organic directing agents, hereinafter more particularly described. This second method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, a combination of organic directing agent and additional organic directing agent (R), and solvent or solvent mixture, such as, for example, $C_1$–$C_6$ alcohols, $C_{1-6}$ diols and/or water, especially water, said reaction mixture having a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.1 to 2.0 | 0.12 to 1.0 | wherein e and f are the weighted average valences of M and R, respectively.

In this second method, when no Z and/or W oxides are added to the reaction mixture, the pH is important and must be maintained at from about 9 to about 14. When Z and/or W oxides are present in the reaction mixture, the pH is not narrowly important for crystallization of the present invention.

A third method for synthesis or of the present crystalline material is where X comprises aluminum and Y comprises silicon, the crystallization temperature must be from about 25° C. to about 175° C., preferably from about 50° C. to about 150° C., and an organic directing agent, hereinabove more particularly described, or, preferably a combination of that organic directing agent plus an additional organic agent, hereinafter more particularly described, is used. This third method comprises preparing a reaction mixture containing sources of, for example, alkali or alkaline earth metal (M), e.g. sodium or potassium, cation if desired, one or more sources of aluminum and/or silicon, an organic (R) directing agent, and a solvent or solvent mixture, such as, for example $C_1$–$C_6$ alcohols, $C_1$–$C_6$ diols and/or water, especially water, said reaction mixture having a composition, in terms of mole ratios of oxides, within the following ranges:

| Reactants | Useful | Preferred |
|---|---|---|
| $Al_2O_3/SiO_2$ | 0 to 0.5 | 0.001 to 0.5 |
| Solvent/$SiO_2$ | 1 to 1500 | 5 to 1000 |
| $OH/SiO_2$ | 0 to 10 | 0 to 5 |
| $(M_{2/e}O + R_{2/f}O)/(SiO_2 + Al_2O_3)$ | 0.01 to 20 | 0.05 to 5 |
| $M_{2/e}O/(SiO_2 + Al_2O_3)$ | 0 to 5 | 0 to 3 |
| $R_{2/f}O/(SiO_2 + Al_2O_3)$ | 0.01 to 2 | 0.03 to 1 | wherein e and f are the weighted average valences of M and R, respectively.

In this third method, the pH is important and must be maintained at from about 9 to about 14. This method involves the following steps:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) To the primary template mixture of step (1) add the sources of oxides, e.g. silica and/or alumina such that the ratio of $R_{2/f}O/(SiO_2+Al_2O_3)$ is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for the present synthesis involves the reaction mixture used for the third method, but the following specific procedure with tetraethylorthosilicate the source of silicon oxide:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) Mix the primary template mixture of step (1) with tetraethylorthosilicate and a source of aluminum oxide, if desired, such that the $R_{2/f}O/SiO_2$ mole ratio is in the range of from about 0.05 to about 2.0.

(3) Agitate the mixture resulting from step (2) for from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C. to about 150° C., preferably from about 95° C. to about 110° C., for from about 4 to about 72 hours, preferably from about 16 to about 48 hours.

In each of the above methods, batch crystallization of the present crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g. from about 5 minutes to about 14 days. Thereafter, the crystals are separated from the liquid and recovered.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

By adjusting conditions of the synthesis reaction for each method, like temperature, pH and time of reaction, etc., within the above limits, embodiments of the present non-layered crystalline material with a desired average pore size may be prepared. In particular, changing the pH, the temperature or the reaction time may promote formation of product crystals with different average pore size.

Non-limiting examples of various combinations of W, X, Y and Z contemplated for the first and second synthesis methods of the present invention include:

| W  | X  | Y  | Z |
|----|----|----|---|
| —  | Al | Si | — |
| —  | Al | —  | P |
| —  | Al | Si | P |
| Co | Al | —  | P |
| Co | Al | Si | P |
| —  | —  | Si | — | including the combinations of W being Mg, or an element selected from the divalent first row transition metals, e.g. Mn, Co and Fe; X being B, Ga or Fe; and Y being Ge.

An organic directing agent for use in each of the above procedures is an ammonium or phosphonium ion of the formula $R_1R_2R_3R_4Q^+$, i.e.:

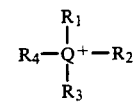

wherein Q is nitrogen or phosphorus and wherein at least one of $R_1$, $R_2$, $R_3$ and $R_4$ is aryl or alkyl of from 7 to about 36 carbon atoms, e.g., $-C_7H_{15}$, $-C_{10}H_{21}$, $-C_{12}H_{25}$, $-C_{14}H_{29}$, $-C_{16}H_{33}$ and $-C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. The compound from which the above ammonium or phosphonium ion is derived may be, for example, the hydroxide, halide, silicate, or mixtures thereof.

In the first and third methods above it is preferred to have an additional organic directing agent and in the second method it is required to have a combination of the organic directing agent described hereinabove and an additional organic directing agent. That additional organic directing agent is the ammonium or phosphonium ion of the above directing agent formula wherein $R_1$, $R_2$, $R_3$ and $R_4$ together or separately are selected from the group consisting of hydrogen and alkyl of 1 to 5 carbon atoms and combinations thereof. Any such combination of organic directing agents go to make up "R" and will be in molar ratio of about 100/1 to about 0.01/1, first above listed organic directing agent/additional organic directing agent.

The particular effectiveness of the presently required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethyl-phosphonium, octadecyltrimethylphosphonium, benzyltrimethyl-ammonium, cetylpyridinium, myristyltrimethylammonium, dodecyltrimethylammonium and dimethyldidodecylammonium.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The present compositions are useful as catalyst components for catalyzing the conversion of organic compounds, e.g. oxygenates and hydrocarbons, by acid-catalyzed reactions. The size of the pores is also such that the spatiospecific selectivity with respect to transition state species is minimized in reactions such as cracking (Chen et al., "Shape Selective Catalysts in Industrial Applications", 36 CHEMICAL INDUSTRIES, pgs. 41–61 (1989) to which reference is made for a discussion of the factors affecting shape selectivity). Diffusional limitations are also minimized as a result of the very large pores in the present materials. For these reasons, the present compositions are especially useful for catalyzing reactions which occur in the presence of acidic sites on the surface of the catalyst and which involve reactants, products or transitional state species which have large molecular sizes, too great for undergoing similar reactions with conventional large pore size solid catalysts, for example, large pore size zeolites such as zeolite X, Y, L, ZSM-4, ZSM-18, and ZSM-20.

Thus, the present catalytic compositions will catalyze reactions such as cracking, and hydrocracking, and other conversion reactions using hydrocarbon feeds of varying molecular sizes, but with particular applicability to feeds with large molecular sizes such as highly aromatic hydrocarbons with substituted or unsubstituted polycyclic aromatic components, bulky naphthenic compounds or highly substituted compounds with bulky steric configurations, e.g. molecular sizes of about 13 Angstroms or more. The present catalytic compositions are particularly useful for reactions in which the molecular weight of the feed is reduced to a lower value, i.e. to reactions involving cracking such as cracking or hydrocracking. Cracking may be conducted at a temperature of from about 200° C. to about 800° C., a pressure of from about atmospheric to about 100 psig and contact time of from about 0.1 second to about 60 minutes. Hydrocracking may be conducted at a temperature of from about 150° C. to about 550° C., a pressure of from about 100 psig to about 3000 psig, and a weight hourly space velocity of from about 0.1 hr$^{-1}$ to about 1100 hr$^{-1}$, with a hydrogen/hydrocarbon molar ratio of from about 0.1 to about 100.

The catalytic compositions of matter according to the present invention may also be used for selective conversion of inorganic compounds such as oxides of nitrogen in mixtures of gases which contain nitrogen oxides ($NO_x$), for example, industrial exhaust gases and the gases formed during the oxidative regeneration of catalysts used in the processing of hydrocarbons, especially in catalytic cracking operations. The porous crystalline material may be used in a matrixed or unmatrixed form for this purpose and may suitably be formed into extrudates, pellets or other shapes to permit the passage of gases over the catalyst with the minimum pressure drop. The crystalline material is preferably at least partly in the hydrogen form, but it may advantageously contain a minor amount of noble metal as a catalytic component, especially a metal of Periods 5 and 6 Group VIIIA of the Periodic Table, especially platinum, palladium, ruthenium, rhodium, iridium or mixtures thereof. Amounts of noble metal up to about 1 weight percent are typical with lower amounts, e.g. up to about 0.1 or 0.5 weight percent being preferred.

The $NO_x$ reduction is suitably conducted by passing the gas containing the oxides of nitrogen over the catalyst at an elevated temperature, typically at least 200° C., and usually within the range of 200 to 600° C. The gas mixture may be mixed with ammonia to promote reduction of the oxides of nitrogen and pre-mixing may be conducted at a temperature of up to about 200° C. The amount of ammonia which is mixed with the gas mixture is typically within the range of 0.75 to 1.25 the stoichiometric amount, which itself varies according to the ratio of the different oxides of nitrogen in the gas mixture, as shown by the equations:

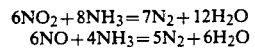

$$6NO_2 + 8NH_3 = 7N_2 + 12H_2O$$
$$6NO + 4NH_3 = 5N_2 + 6H_2O$$

The crystalline catalytic compositions of matter may also be used for the reduction of oxides of nitrogen in gaseous mixtures in the presence of other reducing agents such as carbon or carbon monoxide. Reduction of the oxides of nitrogen in this way is of particular utility in the regeneration of fluid catalytic cracking (FCC) catalysts, since regeneration under appropriate conditions will produce the required concentrations of carbon monoxide which may then be used to reduce the proportion of $NO_x$ in the regeneration gases in the presence of the catalyst.

Because the present catalytic compositions have been found to be stable, their use as cracking catalysts, e.g. in fluid catalytic cracking processes, with resid feeds will represent an especially favorable mode of utilization. Still further, they may be used in combination with one or more other catalyst components such as, for example, cracking catalysts comprising silica-alumina and/or zeolite Y, e.g. USY.

The present catalytic compositions are especially useful for reactions using high molecular weight, high boiling or non-distillable feeds, especially residual feeds, i.e. feeds which are essentially non-distillable or feeds which have an initial boiling point (5% point) above about 1050° F. Residual feeds which may be used with the present catalytic compositions include feeds with API gravities below about 20, usually below 15 and typically from 5 to 10 with Conradsen Carbon Contents (CCR) of at least 1% by weight and more usually at least 5% or more, e.g. 5%–10%. In some resid fractions the CCR may be as high as about 20 weight percent or even higher. The aromatic contents of these feeds will be correspondingly high, as may the contents of heteroatoms such as sulfur and nitrogen, as well as metals. Aromatics content of these feeds will usually be at least 50 weight percent and typically much higher, usually at least 70 or 80 weight percent, with the balance being principally naphthenes and heterocyclics. Typical petroleum refinery feeds of this type include atmospheric and vacuum tower resids, asphalts, aromatic extracts from solvent extraction processes, e.g. phenol or furfural extraction, deasphalted oils, slop oils and residual fractions from various processes such as lube production, coking and the like. High boiling fractions with which the present catalytic compositions may be used include gas oils, such as atmospheric gas oils; vacuum gas oils; cycle oils, especially heavy cycle oil; deasphalted oils; solvent extracts, such as bright stock; heavy gas oils, such as coker heavy gas oils; and the like. The present catalytic material may also be utilized with feeds of non-petroleum origin, for example, synthetic oils produced by coal liquefaction, Fischer-Tropsch waxes and heavy fractions and other similar materials.

The compositions of this invention can also be used as adsorbents and separation vehicles in pharmaceutical and fine chemical applications. For example, these ultra-large pore compositions may be used in the purification of drugs like insulin or be used as solid vehicles for the controlled delivery of drugs. Another application for use of these ultra-large pore materials involves waste disposal where the extraordinary pore volumes are exploited. Therefore, at least one component can be partially or substantially totally separated from a mixture of components having differential sorption characteristics with respect to the present ultra-large pore composition by contacting the mixture with the composition to selectively sorb the one component. Examples of this include contacting a mixture comprising water and at least one hydrocarbon component, whereby at least one hydrocarbon component is selectively sorbed. Another example includes selective sorption of at least one hydrocarbon component from a mixture comprising same and at least one additional hydrocarbon component.

As in the case of many catalysts, it may be desired to incorporate the new crystal composition with another material resistant to the temperatures and other conditions employed in organic conversion processes. Such materials include active and inactive materials and synthetic or naturally occurring zeolites as well as inorganic materials such as clays, silica and/or metal oxides such as alumina, titania and/or zirconia. The latter may be either naturally occurring or in the form of gelatinous precipitates or gels including mixtures of silica and metal oxides. Use of a material in conjunction with the new crystal, i.e. combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated with naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the new crystal can be composited with a porous matrix such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

It may be desirable to provide at least a part of the foregoing matrix in colloidal form so as to facilitate extrusion of the bound catalyst components(s).

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented. In the examples, whenever sorption data are set forth for comparison of sorptive capacities for water, cyclohexane, benzene and/or n-hexane, they are Equilibrium Adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms-of grams/100 grams adsorbent based on adsorbent weight after calcination at about 540° C. The present composition exhibits an equilibrium benzene adsorption capacity at 50 Torr and 25° C. of greater than about 15 grams/100 grams, particularly greater than about 17.5 grams/100 grams and more particularly greater than about 20 grams/100 grams.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 Torr of benzene vapor, at 25° C. The pressure is kept constant (within about ±0.5 mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change is not sufficient to activate the monostat.

Another way of doing this for benzene adsorption data is on a suitable thermogravimetric analysis system, such as a computer-controlled 990/951 duPont TGA system. The adsorbent sample is dehydrated (physically sorbed water removed) by heating at, for example, about 350° C. or 500° C. to constant weight in flowing helium. If the sample is in as-synthesized form, e.g. containing organic directing agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr of benzene is taken from a plot of adsorption isotherm.

In the examples, percentages are by weight unless otherwise indicated.

EXAMPLE 1

Forty grams of cetyltrimethylammonium (CTMA) hydroxide solution, prepared by contacting a 29 wt. % N,N,N-trimethyl-1-hexadecanaminium chloride solution with an excess of hydroxide-for-halide resin, was combined with ten grams of an aqueous solution of 25% (by weight) tetramethylammonium (TMAOH) hydroxide, 9.1 grams of Di-s-butoxyaluminoxytriethyloxysilane (DBALS) with stirring. Five grams of HiSil, a precipitated hydrated silica containing about 6 wt. % free water and about 4.5 wt. % bound water of hydration and having an ultimate particle size of about 0.02 micron, was added. The resulting mixture was placed in a polypropylene bottle and put into a steam box (about 100° C.) for 72 hours. The mixture had a composition in terms of moles per mole of $Al_2O_3$(source—HiSil and DBALS):

7.6 moles of $SiO_2$
1.5 moles of $(CTMA)_2O$
1.1 moles of $(TMA)_2O$
156 moles of $H_2O$ The resulting solid product was recovered by filtration and dried in air at ambient temperature. The XRD pattern of the as synthesized material is shown in FIG. 1. It can be seen that the pattern included a very strong line at a d-spacing of 40.6±2 Angstroms and weak lines at d-spacings of 23.6±2, 20.5±1 and 15.4±1 Angstroms. The product had a composition (by chemical analyses) in terms of mole per mole of $Al_2O_3$:

8.4 moles of $SiO_2$
25.8 moles of C
2.8 moles of N

EXAMPLE 2

A portion of the product from Example 1 was then calcined at 540° C. for one hour in nitrogen, followed by six hours in air. The XRD pattern of the calcined product is shown in FIG. 2.

What is claimed is:

1. A method for synthesizing a composition of matter comprising an inorganic, porous, non-layered crystalline phase material exhibiting, after calcination, an X-ray diffraction pattern with at least one peak at a d-spacing greater than about 18 Angstrom Units and having a benzene adsorption capacity of greater than 15 grams benzene per 100 grams of said material at 50 torr and 25° C. which comprises (i) preparing a reaction mixture capable of forming said composition, said mixture comprising one or a combination of oxides selected from a group consisting of divalent element, trivalent element, tetravalent element and pentavalent element, organic directing agent and solvent or solvent mixture, said organic directing agent comprising an ion of the formula $R_1R_2R_3R_4Q^+$, wherein Q is nitrogen or phosphorus and wherein at least one of $R_1$, $R_2$, $R_3$ and $R_4$ is aryl or alkyl of from 7 to about 36 carbon atoms or combinations thereof, the remainder of $R_1$, $R_2$, $R_3$ and $R_4$ being selected from the group consisting of hydrogen, alkyl of from 1 to 5 carbon atoms and combinations thereof, (ii) maintaining said mixture under sufficient conditions of pH, temperature and time for formation of said composition of matter, and (iii) recovering said composition of matter, wherein a dialkoxyaluminoxytrialkoxysilane is in the reaction mixture in step (i).

2. The method of claim 1 wherein the composition of matter comprises an inorganic, porous crystalline phase material having a hexagonal arrangement of uniformly-sized pores at least about 13 Angstroms diameter and exhibiting, after calcination, a hexagonal electron diffraction pattern that can be indexed with a $d_{100}$ value greater than 18 Angstrom Units.

3. The method of claim 1 wherein said reaction mixture has a composition, in terms of mole ratios, within the following ranges:

| | |
|---|---|
| $X_2O_3/YO_2$ | 0 to 0.5 |
| $Al_2O_3/SiO_2$ | 0 to 0.01 |
| $X_2O_3/(YO_2 + Z_2O_5)$ | 0.1 to 100 |
| $X_2O_3/YO_2 + WO + Z_2O_5$ | 0.1 to 100 |
| Solvent/ $(YO_2 + WO + Z_2O_5 + X_2O_3)$ | 1 to 1500 |
| $OH/YO_2$ | 0 to 10 |
| $(M_{2/e}O + R_{2/f}O)/ (YO_2 + WO + Z_2O_5 + X_2O_3)$ | 0.01 to 20 |
| $M_{2/e}O/ (YO_2 + WO + Z_2O_5 + X_2O_3)$ | 0 to 10 |
| $R_{2/f}O/ (YO_2WO + Z_2O_5 + X_2O_3)$ | 0.01 to 2.0 | wherein M is an alkali or alkaline earth metal cation, W is said divalent element, X is said trivalent element, Y is said tetravalent element, Z is said pentavalent element, R is said organic directing agent, and e and f are the weighted average valences of M and R, respectively.

4. The method of claim 3 wherein R comprises an organic directing agent selected from a group consisting of cetyltrimethylammonium, octadecyltrimethylammonium, benzyltrimethylammonium, cetylpyridinium, myristyltrimethylammonium, decyltrimethylammonium, dodecyltrimethylammonium and dimethyldidodecylammonium.

5. The method of claim 1 wherein said solvent is selected from a group consisting of $C_1$-$C_6$ alcohol, $C_1$-$C_6$ diol, water and mixture thereof.

6. The method of claim 1 wherein the alkoxyaluminoxytrialkoxysilane is represented by the formula $(RO)_2$—Al—O—Si—$(OR')_3$, wherein R=$C_{1-4}$ and R'=$C_{1-4}$.

7. The method of claim 1 wherein the dialkoxyaluminoxyakoxysilane comprises di-s-butoxyaluminoxytrrethoxysilane.

8. The method of claim 1 wherein a $SiO_2/Al_2O_3$ of the crystalline phase material is less than about 100:1.

9. The method of claim 1 wherein the $SiO_2/Al_2O_3$ of the crystalline phase material is less than about 20:1.

10. The method of claim 1 wherein the $SiO_2/Al_2O_3$ of the crystalline phase material is less than about 10:1.

11. The method of claim 1 wherein said reaction mixture has a composition, in terms of mole ratios, within the following ranges:

| | |
|---|---|
| $Al_2O_3/SiO_2$ | 0 to 0.5 |
| Solvent/$SiO_2$ | 1 to 1500 |
| $OH/SiO_2$ | 0 to 10 |
| $(M_{2/e}O + R_{2/f}O)/ (SiO_2 + Al_2O_3)$ | 0.01 to 20 |
| $M_{2/e}O/ (SiO_2 + Al_2O_3)$ | 0 to 5 |
| $R_{2/f}O/ (SiO_2 + Al_2O_3)$ | 0.01 to 2 | wherein M is an alkali or alkaline earth metal ion, R is said organic agent, and e and f are the weighted average valences of M and R, respectively.

12. The method of claim 11 wherein said reaction mixture comprises an additional organic directing agent ion R of the formula $R_1R_2R_3R_4Q^+$, wherein $R_1$, $R_2$, $R_3$ and $R_4$ are selected from the group consisting of hydrogen, alkyl of 1 to 5 carbon atoms and combinations thereof.

13. The method of claim 11 wherein R comprises an organic directing agent selected from a group consisting of cetyltrimethylammonium, octadecyltrimethylammonium, benzyltrimethylammonium, cetylpyridinium, myristyltrimethylammonium, decyltrimethylammonium, dodecytrimethylammonium and dimethyldodecylammonium.

14. The method of claim 11 wherein said solvent is selected from a group consisting of $C_1$-$C_6$ alcohol, $C_1$-$C_6$ diol, water and mixture thereof.

15. The method of claim 11 wherein the dialkoxyaluminoxytrialkoxysilane is represented by the formula $(RO)_2$—Al—O—Si—$(OR')_3$, wherein $R=C_{1-4}$ and $R'=C_{1-4}$.

16. The method of claim 11 wherein the dialkoxyaluminoxytrialkoxysilane comprises di-s-butoxyaluminoxytriethoxysilane.

17. The method of claim 11 wherein the $SiO_2/Al_2O_3$ of the crystalline phase material is less than about 100:1.

18. The method of claim 11 wherein the $SiO_2/Al_2O_3$ of the crystalline phase material is less than about 20:1.

19. The method of claim 11 wherein the $SiO_2/Al_2O_3$ of the crystalline phase material is less than about 10:1.

20. A product of the method of claim 1.
21. A product of the method of claim 8.
22. A product of the method of claim 9.
23. A product of the method of claim 10.
24. A product of the method of claim 2.
25. The product of claim 24 wherein the $SiO_2/Al_2O_3$ of the crystalline phase material is less than about 100:1.
26. The product of claim 25 wherein the $SiO_2/Al_2O_3$ is less than about 20:1.
27. The product of claim 26 wherein the $SiO_2/Al_2O_3$ is less than about 10:1.

* * * * *

UNITED STATES PATENT AND TRADEMARK OFFICE
CERTIFICATE OF CORRECTION

PATENT NO. : 5,110,572
DATED : May 5, 1992
INVENTOR(S) : D.C. Calabro, et al.

It is certified that error appears in the above-indentified patent and that said Letters Patent is hereby corrected as shown below:

| | |
|---|---|
| Col. 3, line 45 | "989" should be --1989-- |
| Col. 6, line 40 | "$O_d$" should be --$O_h$-- |
| Col. 8, line 25 | "$d_{100} = a_o \sqrt{3/2}$" should be --$d_{100} = a_o \sqrt{3}/2$ -- |
| Col. 10, line 67 | "react" should be --reaction-- |
| Col. 11, line 29 | "$OH/YO_2$" should be --$OH^-/YO_2$-- |
| Col. 12, line 10 | "$OH/YO_2$" should be --$OH^-/YO_2$-- |
| Col. 12, line 25 | delete "or" |
| Col. 12, line 48 | "$OH/SiO_2$" should be --$OH^-/SiO_2$-- |
| Col. 15, line 51 | "1100" should be --100-- |
| Col. 20, claim 3, line 20 | "$OH/YO_2$" should be --$OH^-/YO_2$-- |

UNITED STATES PATENT AND TRADEMARK OFFICE
CERTIFICATE OF CORRECTION

PATENT NO. : 5,110,572
DATED : May 5, 1992
INVENTOR(S) : D.C. Calabro, et al.

It is certified that error appears in the above-indentified patent and that said Letters Patent is hereby corrected as shown below:

Col. 20, claim 11, line 62    "$OH/SiO_2$" should be --$OH^-/SiO_2$--

Signed and Sealed this

Seventh Day of September, 1993

Attest:

BRUCE LEHMAN

Attesting Officer    Commissioner of Patents and Trademarks